US011575180B2

(12) United States Patent
Yeh et al.

(10) Patent No.: US 11,575,180 B2
(45) Date of Patent: Feb. 7, 2023

(54) SEPARATOR AND METHOD FOR MANUFACTURING THEREOF

(71) Applicant: BenQ Materials Corporation, Taoyuan (TW)

(72) Inventors: Wei-Ting Yeh, Taoyuan (TW); Yi-Fang Huang, Taoyuan (TW); Kai-Wei Cheng, Taoyuan (TW); Yu-Ruei Li, Taoyuan (TW); Wan-Ting Lo, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 0 days.

(21) Appl. No.: 17/160,455

(22) Filed: Jan. 28, 2021

(65) Prior Publication Data

US 2021/0296734 A1    Sep. 23, 2021

(30) Foreign Application Priority Data

Mar. 19, 2020 (TW) .................................. 109109188
Jul. 30, 2020 (TW) .................................. 109125863

(51) Int. Cl.
*H01M 50/451* (2021.01)
*H01M 50/414* (2021.01)
*H01M 50/409* (2021.01)
*H01M 50/431* (2021.01)
*H01M 50/403* (2021.01)

(52) U.S. Cl.
CPC ....... *H01M 50/451* (2021.01); *H01M 50/403* (2021.01); *H01M 50/409* (2021.01); *H01M 50/414* (2021.01); *H01M 50/431* (2021.01)

(58) Field of Classification Search
CPC ............. H01M 50/451; H01M 50/414; H01M 50/403; H01M 50/409; H01M 50/431
See application file for complete search history.

(56) References Cited

U.S. PATENT DOCUMENTS

| 2003/0104273 A1* | 6/2003 | Lee ................... H01M 10/0585 |
| | | 429/254 |
| 2016/0028066 A1* | 1/2016 | Yu ........................ H01M 50/451 |
| | | 429/145 |
| 2018/0233726 A1 | 8/2018 | Nagao |
| 2021/0167393 A1* | 6/2021 | Kuzuoka ............. H01M 50/409 |

FOREIGN PATENT DOCUMENTS

| CN | 102983300 B | 3/2013 |
| CN | 103956447 A | 7/2014 |
| CN | 210129544 U | 3/2020 |
| KR | 20150035168 A | 4/2015 |
| WO | 2018217990 A1 | 11/2018 |
| WO | 2019143483 A1 | 7/2019 |

* cited by examiner

*Primary Examiner* — Christopher P Domone
*Assistant Examiner* — Kimberly Wyluda

(57) ABSTRACT

The disclosure provides a separator comprising a porous substrate and a heat-resistant layer disposed on a surface of the substrate. The heat-resistant layer comprises a binder and a plurality of inorganic particles, wherein the heat-resistant layer is disposed on the surface of the porous substrate in the range of 10% to 90% of the total surface area of the porous substrate.

8 Claims, 7 Drawing Sheets

SEPARATOR AND METHOD FOR MANUFACTURING THEREOF

CROSS-REFERENCE TO RELATED APPLICATION

This application claims priority to Taiwan Application Serial Number 109109188, filed Mar. 19, 2020, and Taiwan Application Serial Number 109125863, filed Jul. 30, 2020, which are herein incorporated by references in its entirety.

BACKGROUND

Field of Invention

The invention relates to a separator, and more particularly to a separator with a heat-resistant layer having inorganic particles.

Description of Related Art

The demand for high energy density and power density lithium-ion battery energy storage systems has been increased with the raise of electric vehicles which are environmental friendly and the rapid development of the 3C products. Separator is a polymer membrane applied to a lithium-ion battery, which is sandwiched between the anode and the cathode to avoid the internal short circuit due to the physical contact between the two electrodes. At the same time, the microporous structures of the separator allows free ions in the electrolyte to pass through between the two electrodes, making the battery generate electrical current. Therefore, the stability of the separator will affect the efficiency of the battery directly. When the microporous of the separator are filled, the total amount of electrolyte absorbed by the separator will decrease and the internal resistance of the lithium battery will increase, which will result in deteriorating the performance of the battery The traditional dry-stretch process for manufacturing separator usually includes the steps of: extruding a melting polymer, then cooling and annealing to form a precursor film with specific crystallinity, and cold stretching and hot stretching the precursor film to form a porous separator. However, the known separator has a drawback of bad heat resistance and poor puncture strength.

In the state of the art, slurry comprising inorganic particles can be coated on the separator made by the aforementioned method for improving the needed properties, such as weatherability, heat resistance or mechanical properties. The high thermal stability of the inorganic particles can provide the separator with high heat resistance. The problem of internal short circuit of the battery caused by drastically thermal shrinkage of the separator due to over charged or high temperature of environment can be avoided by using the separator with the heat-resistant layer having inorganic particles.

However, in the current method for manufacturing separator with heat-resistant layer having inorganic particles made by stretching precursor film and then coating the slurry comprising inorganic particles on the surface of aforementioned separator, when coating the slurry comprising inorganic particles, the porous of the separator are easily be covered by the slurry, which will result in lower the air permeability of the separator, reducing the electrolyte absorption, and thus, the internal resistance of the lithium battery will increase and the battery efficiency will be lower. In addition, the water content of the separator will be increased due to the inorganic particles are easily to absorb water. Battery system with high water content will deteriorate the performance of the battery, which is not good for product application.

Therefore, there is still a need for a separator with heat-resistant layer having inorganic particles, which has great heat resistance and puncture strength and can still maintain suitable water content, good air permeability and lower AC impedance.

SUMMARY

In view of the foregoing problems, the present invention is to provide a separator and a method for manufacturing the same. The method for manufacturing a separator of the present invention comprising the steps of: coating a heat-resistant slurry including a binder and a plurality of inorganic particles on a surface of a nonporous precursor substrate, and then stretching the nonporous precursor substrate to form a porous substrate and a heat-resistant layer disposed on the substrate. The separator made by the method can avoid the particles of the heat-resistant slurry from filling the microporous of the substrate and has great air permeability and lower AC impedance. Meanwhile, the heat-resistant layer can enhance the heat resistance and puncture strength, and maintain the lower water content.

One aspect of the present invention is to provide a separator comprising a porous substrate and a heat-resistant layer comprising a binder and a plurality of inorganic particles. Wherein the heat-resistant layer is disposed on a surface of the porous substrate in the range of 10% to 90% of the total surface area of the porous substrate.

In an embodiment of the present invention, the heat-resistant layer is a continuous network structure or an island structure on the surface of the porous substrate.

In an embodiment of the present invention, the heat-resistant layer is disposed on one or two surfaces of the porous substrate.

In an embodiment of the present invention, the thickness of the heat-resistant layer is in the range of 0.01 μm to 20 μm.

In an embodiment of the present invention, the heat-resistant layer comprises 1 to 20 parts by weight of the binder and 80 to 99 parts by weight of the inorganic particles.

In an embodiment of the present invention, the median diameter ($D_{50}$) of the inorganic particles is in the range of 0.01 μm to 10 μm.

In an embodiment of the present invention, the heat-resistant layer is formed on a surface of the porous substrate by coating a heat-resistant slurry on a surface of a nonporous precursor substrate to form a coated nonporous precursor substrate and stretching thereafter to generate a separator comprising the porous substrate and the heat-resistant layer.

In an embodiment of the present invention, the binder can be selected from at least one of the group consisting of polyvinyl chloride (PVC), polyvinyl fluoride (PVF), polytetrafluoroethylene (PTFE), polyvinylidene fluoride (PVDF), polyvinylidene fluoride-tetrafluoroethylene (PVDF-TFE), polyvinylidene fluoride-hexafluoropropylene (PVDF-HFP), polyvinylidene fluoride-trichloroethylene copolymer, polyvinylidene fluoride-tetrafluoroethylene chloride (PVDF-CTFE), poly(methyl)(meth)acrylate (P(M)(M)A), polyacrylonitrile (PAN), polyvinylacetate (PVA), polyethylene-vinyl acetate copolymer, polyimide (PI), styrene butadiene rubber (SBR), polyethylene oxide (PEO), propylene oxide (PPO), poly(N-vinylacetamide) (PNVA) and poly(N-vinylformamide) (PNVF), or combinations thereof.

In an embodiment of the present invention, the inorganic particles can be selected from at least one of the group consisting of $BaTiO_3$, $Pb(Zr,Ti)O_3$ (PZT), $Pb_{1-x}La_xZr_{1-y}Zr_{,}Ti_yO_3$ (PLZT, wherein $0<x<1$ and $0<y<1$), $Pb(Mg_{1/3}Nb_{2/3})O_3$—$PbTiO_3$ (PMN-PT), $HfO_2$, $SrTiO_2$, $SnO_2$, $CeO_2$, $MgO$, $Mg(OH)_2$, $NiO$, $CaO$, $ZnO$, $ZrO_2$, $SiO_2$, $Y_2O_3$, $Al_2O_3$, Boehmite (AlOOH), SiC and $TiO_2$, or combinations thereof.

Another aspect of the present invention is to provide a method for manufacturing the aforementioned separator, which comprises the steps of: providing a nonporous precursor substrate; coating a heat-resistant slurry on a surface of the nonporous precursor substrate to form a heat-resistant coating layer, wherein the heat-resistant slurry comprises a binder and a plurality of inorganic particles; and stretching the nonporous precursor with the heat-resistant coating layer formed thereon to generate a separator comprising a porous substrate and a heat-resistant layer; wherein the heat-resistant layer is disposed on the surface of the substrate in the range of 10% to 90% of the total surface area of the porous substrate.

In an embodiment of the method of the present invention, the heat-resistant slurry comprises 1 to 20 parts by weight of the binder and 80 to 99 parts by weight of the inorganic particles.

In an embodiment of the method of the present invention, the heat-resistant slurry further comprises a solvent, wherein the solvent can be selected from at least one of the group consisting of water, acetone, N-methylpyrrolidone (NMP), dimethylacetamide (DMAC) and dimethyl sulfoxide (DMSO), or combinations thereof.

In an embodiment of the method of the present invention, the median diameter ($D_{50}$) of the inorganic particles is in the range of 0.01 μm to 10 μm.

In an embodiment of the method of the present invention, the nonporous precursor substrate can comprise a material of polyethylene (PE), polypropylene (PP), polyester or polyamide.

In an embodiment of the method of the present invention, the step of stretching can comprise a first stretching along with a first direction.

In an embodiment of the method of the present invention, the first stretching can comprise a cold stretching and a hot stretching.

In an embodiment of the method of the present invention, the cold stretching can be conducted at a temperature in the range of 5° C. to 50° C. under a cold stretching ratio in the range of 5% to 60%.

In an embodiment of the method of the present invention, the hot stretching can be conducted at a temperature in the range of 80° C. to 160° C. under a hot stretching ratio in the range of 80% to 400%.

In an embodiment of the method of the present invention, the step of stretching can further comprise a first relax along with the first direction under a first relax ratio in the range of 0.1% to 30%.

In an embodiment of the method of the present invention, the step of stretching can further comprise a second stretching along with a second direction, and the second direction is perpendicular to the first direction.

In an embodiment of the method of the present invention, the second stretching can be conducted at a temperature in the range of 110° C. to 135° C. under a second stretching ratio in the range of 10% to 150%.

In an embodiment of the method of the present invention, the step of stretching can further comprise a second relax along with the first direction under a second relax ratio in the range of 5% to 50%.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION

Figure 1:
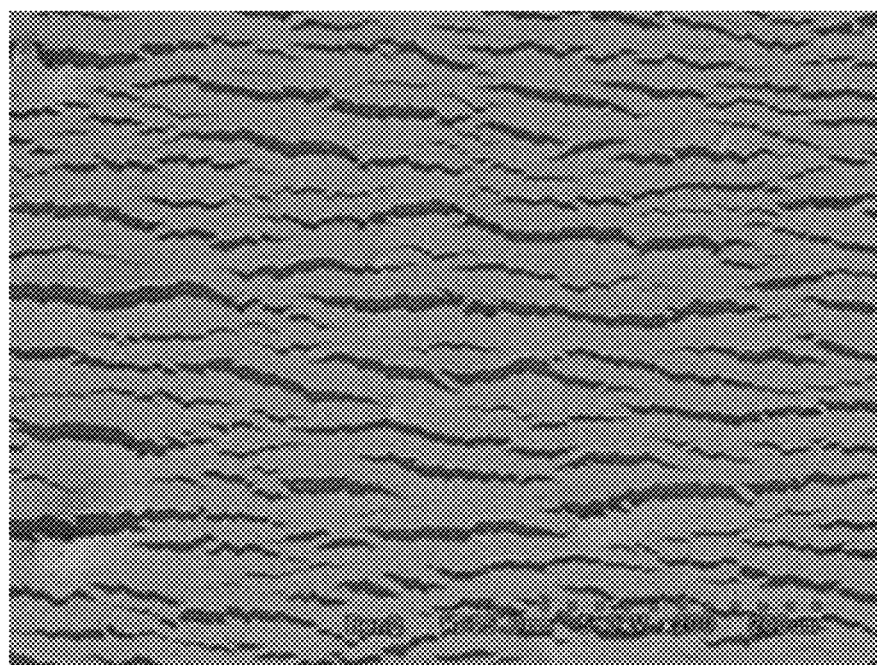
FIG. 1 shows a scanning electron microscopic (SEM) image (magnification of 200 times) of a surface of the separator of Example 1 according to the present invention.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylic acid" used herein refers to acrylic acid or methacrylic acid. The term "(meth)acrylate" used herein refers to acrylate or methacrylate.

The present invention is to provide a separator comprising a porous substrate and a heat-resistant layer disposed on a surface of the porous substrate.

In an embodiment of the present invention, the porous substrate suitable for the separator of the present invention may be, for example, but not limited to a single-layered or multi-layered porous membrane containing polyolefin, polyester, or polyamide. In an embodiment of the present invention, the porous substrate may be a single-layer polyethylene (PE), a single-layer polypropylene (PP), a two-layer polyethylene/polypropylene (PE/PP), or a three-layer polypropylene/polyethylene/polypropylene (PP/PE/PP), but not limited thereto. In an embodiment of the present invention, the thickness of the porous substrate is in the range of 7 μm to 30 μm, and preferably in the range of 9 μm to 25 μm, the porosity thereof is in the range of about 30% to 80%, the diameter of the pores thereof is in the range of 0.01 μm to 0.1 μm, and preferably in the range of 0.01 μm to 0.5 μm.

The heat-resistant layer can comprise a binder and a plurality of inorganic particles, but not limited thereto. In an embodiment of the present invention, the heat-resistant layer can comprise 1 to 20 parts by weight of the binder and 80 to 99 parts by weight of the inorganic particles.

The heat-resistant layer can be a structure which does not cover the surface of the porous substrate completely, for example, such as, a continuous network structure or an island structure on the surface of the porous substrate, but not limited thereto.

In an embodiment of the present invention, the heat-resistant layer is disposed on one or two surfaces of the porous substrate.

In an embodiment of the present invention, the heat-resistant layer is formed by coating a heat-resistant slurry on a surface of a nonporous precursor substrate to form a coated nonporous precursor substrate and stretching thereafter to generate a separator having the porous substrate and the heat-resistant layer. In an embodiment of the present invention, the heat-resistant layer is disposed on the surface of the porous substrate in the range of 10% to 90%, and preferably in the range of 30% to 80%. When the heat-resistant layer covering rate on the substrate is too high, the air permeability and AC impedance of the separator will be affected and the water content of the separator will be increased. When the heat-resistant layer covering rate on the substrate is too low, the heat resistant of the separator will not be improved effectively. The thickness of the heat-resistant layer can be in the range of 0.01 μm to 20 μm, and preferably in the range of 0.1 μm to 10 μm. The space between the inorganic particles can form a plurality of micropores. The diameter of the micropores can be in the range of 0.01 μm to 50 μm, and preferably in the range of 0.1 μm to 40 μm. The porosity of the heat-resistant layer can be in the range of 10% to 95%, and preferably in the range of 20% to 80%.

Suitable binder of the present invention can be a binder that is stable to the electrolyte of the battery and can bind inorganic particles to the porous substrate. In an embodiment of the present invention, the binder can be, for example, polyvinyl chloride (PVC), polyvinyl fluoride (PVF), polytetrafluoroethylene (PTFE), polyvinylidene fluoride (PVDF), polyvinylidene fluoride-tetrafluoroethylene (PVDF-TFE), polyvinylidene fluoride-hexafluoropropylene (PVDF-HFP), polyvinylidene fluoride-trichloroethylene copolymer, polyvinylidene fluoride-tetrafluoroethylene chloride (PVDF-CTFE), poly(methyl) (meth)acrylate (P(M)(M)A), polyacrylonitrile (PAN), polyvinylacetate (PVA), polyethylene-vinyl acetate copolymer, polyimide (PI), styrene butadiene rubber (SBR), polyethylene oxide (PEO), propylene oxide (PPO), poly(N-vinylacetamide) (PNVA) or poly(N-vinylformamide) (PNVF), but not limited thereto. The above-mentioned binders can be used alone or in combination.

Suitable inorganic particles can be the inorganic particles commonly used in the field of separators, such as, the inorganic particles with a dielectric constant not less than 5. In an embodiment of the present invention, the median diameter ($D_{50}$) of the inorganic particles is in the range of 0.01 μm to 10 μm. Suitable inorganic particles of the present invention can be, for example, $BaTiO_3$, $Pb(Zr,Ti)O_3$ (PZT), $Pb_{1-x}La_xZr_{1-y}Zr_{y}Ti_{y}O_3$ (PLZT, wherein 0<x<1 and 0<y<1), $Pb(Mg_{1/3}Nb_{2/3})O_3$—$PbTiO_3$ (PMN-PT), $HfO_2$, $SrTiO_2$, $SnO_2$, $CeO_2$, $MgO$, $Mg(OH)_2$, $NiO$, $CaO$, $ZnO$, $ZrO_2$, $SiO_2$, $Y_2O_3$, $Al_2O_3$, Boehmite (AlOOH), SiC or $TiO_2$, but not limited thereto. The above-mentioned inorganic particles can be used alone or in combination.

The separator with a heat-resistant layer of the present invention can has a needed physical properties as a separator, such as, a shrinkage (130° C./1 hr) not more than 30%, a water content (moisture) less than 550 ppm, Gurley number less than 220 sec, an AC impedance less than 1.6 ohm·cm$^2$ and a puncture strength more than 280 gf.

Another aspect of the present invention is to provide a method for manufacturing the aforementioned separator, which comprises the steps of: providing a nonporous precursor substrate; coating a heat-resistant slurry on a surface of the nonporous precursor substrate to form a heat-resistant coating layer, wherein the heat-resistant slurry comprises a binder and a plurality of inorganic particles; and stretching the nonporous precursor substrate with the heat-resistant coating layer formed thereon to generate a separator comprising a porous substrate and a heat-resistant layer; wherein the heat-resistant layer is disposed on the surface of the porous substrate in the range of 10% to 90% of the total surface area of the porous substrate. The heat-resistant layer can be a structure which does not cover the porous substrate completely, for example, a continuous network structure or an island structure on the surface of the porous substrate, but not limited thereto.

In an embodiment of the method of the present invention, the material of the nonporous precursor substrate can be polyethylene (PE), polypropylene (PP), polyester, polyamide or the combinations thereof. The nonporous precursor substrate can be made by, for example, but not limited to melting and extruding a polymer. The nonporous precursor substrate can be single-layered or multi-layer membraned, for example, a single-layered polyethylene (PE), a single-layered polypropylene (PP), a two-layered polyethylene/polypropylene (PE/PP), or a three-layered polypropylene/polyethylene/polypropylene (PP/PE/PP), but not limited thereto.

In an embodiment of the method of the present invention, the heat-resistant slurry can comprise 1 to 20 parts by weight of the binder and 80 to 99 parts by weight of the inorganic particles.

Suitable binder of the present invention can be a binder that is stable to the electrolyte of the battery and can bind inorganic particles to the substrate. In an embodiment of the method of the present invention, the binder can be, for example, polyvinyl chloride (PVC), polyvinyl fluoride (PVF), polytetrafluoroethylene (PTFE), polyvinylidene fluoride (PVDF), polyvinylidene fluoride-tetrafluoroethylene (PVDF-TFE), polyvinylidene fluoride-hexafluoropropylene (PVDF-HFP), polyvinylidene fluoride-trichloroethylene copolymer, polyvinylidene fluoride-tetrafluoroethylene chloride (PVDF-CTFE), poly(methyl)(meth)acrylate (P(M)(M)A), polyacrylonitrile (PAN), polyvinylacetate (PVA), polyethylene-vinyl acetate copolymer, polyimide (PI), styrene butadiene rubber (SBR), polyethylene oxide (PEO), propylene oxide (PPO), poly(N-vinylacetamide) (PNVA) or poly(N-vinylformamide) (PNVF), but not limited thereto. The above-mentioned binders can be used alone or in combination.

Suitable inorganic particles can be the inorganic particles commonly used in the field of separators, such as, the inorganic particles with a dielectric constant not less than 5. In an embodiment of the present invention, the median diameter ($D_{50}$) of the inorganic particles is in the range of 0.01 μm to 10 μm. Suitable inorganic particles of the present invention can be, for example, $BaTiO_3$, $Pb(Zr,Ti)O_3$ (PZT), $Pb_{1-x}La_xZr_{1-y}Ti_yO_3$ (PLZT, wherein 0<x<1 and 0<y<1), $Pb(Mg_{1/3}Nb_{2/3})O_3$—$PbTiO_3$ (PMN-PT), $HfO_2$, $SrTiO_2$, $SnO_2$, $CeO_2$, MgO, $Mg(OH)_2$, NiO, CaO, ZnO, $ZrO_2$, $SiO_2$, $Y_2O_3$, $Al_2O_3$, Boehmite (AlOOH), SiC or $TiO_2$, but not limited thereto. The above-mentioned inorganic particles can be used alone or in combination.

In an embodiment of the method of the present invention, the heat-resistant slurry can further comprise a solvent for increasing the processability. Suitable solvent can be for example but not limited to water, acetone, N-methylpyrrolidone (NMP), dimethylacetamide (DMAC), dimethyl sulfoxide (DMSO) or the combinations thereof. The above-mentioned solvent can be used alone or in combination.

In an embodiment of the method of the present invention, the heat-resistant slurry is coated on a one surface of the porous substrate or two surfaces of the porous substrate.

In an embodiment of the method of the present invention, the heat-resistant slurry can optionally comprise for example but not limited to a dispersant, a wetting agent or a surfactant as needed.

In an embodiment of the method of the present invention, the coating method can be, for example, gravure coating, slot-die coating, roll coating, wire-bar coating, blade coating, extrusion coating, dip coating, spin coating or slot-slide coating, but not limited thereto.

In an embodiment of the method of the present invention, the step of stretching can comprise one-step stretching process or multi-step stretching process and optionally one-step relax process or multi-step relax process according to product requirement. The one-step stretching process or multi-step stretching process can be conducted at the same temperature or different temperatures. The relax process can be conducted simultaneously when conducting the stretching process, or after finishing the stretching process.

The step of stretching can comprise a first stretching along with a first direction. The first stretching can preferably comprise a cold stretching and a hot stretching.

In an embodiment of the method of the present invention, the cold stretching ratio can be in the range of 5% to 60%, and preferably in the range of 10% to 50%. The cold stretching can be conducted at a temperature in the range of 5° C. to 50° C., and preferably in the range of 10° C. to 40° C.

In an embodiment of the method of the present invention, the hot stretching ratio can be in the range of 80% to 400%, and preferably in the range of 100% to 300%. The hot stretching can be conducted at a temperature in the range of 80° C. to 160° C., and preferably in the range of 100° C. to 150° C.

In an embodiment of the method of the present invention, after the first stretching, a first relax along with the first direction can be conducted optionally to adjust the physical properties of the separator and the heat-resistant layer covering rate on the surface of the porous substrate. The first relax ratio can be in the range of 0.1% to 30%, and preferably in the range of 10% to 25%.

In another embodiment of the method of the present invention, after the first stretching, a second stretching along with a second direction can be conducted optionally to adjust the physical properties of the separator as needed, such as to decrease the internal resistant, increasing the tensile strength, increasing the porosity or air permeability, or decreasing the tortuosity of the micropores for decreasing the impedance. Wherein the second direction is perpendicular to the first direction. The second stretching can be conducted at a temperature in the range of 110° C. to 135° C., and preferably in the range of 115° C. to 130° C. The second stretching ratio can be in the range of 10% to 150%, and preferably in the range of 20% to 100%.

In another embodiment of the method of the present invention, during the second stretching, a second relax along with the first direction can be conducted optionally. The second relax ratio can be in the range of 5% to 50%, and preferably in the range of 10% to 40%.

The present invention will be explained in further detail with reference to the examples. However, the present invention is not limited to these examples.

Example 1

50 g of $Al_2O_3$ particles (AHP 200, $D_{50}$ of about 0.6 μm, available from Nippon Light Metal Company, Japan) were added into 100 g of polyacrylamide dispersant aqueous solution with a concentration of 0.5% and then the solution was stirred to obtain an $Al_2O_3$ aqueous solution with a concentration of 50%. Next, 5 g of water-soluble polyacrylate (BM-2000M, available from ZEON Corporation, Japan) and 1 g of silicone surfactant (BYK-349, available from BYK-Chemie GmbH, Germany) as wetting agents were added into the $Al_2O_3$ aqueous solution to form a heat-resistant slurry. And then, the heat-resistant slurry was coated on a PP/PE/PP nonporous precursor substrate with a thickness of 21 μm. The PP/PE/PP nonporous precursor substrate with the heat-resistant coating layer was cold stretched (stretch ratio: 45%, stretch temperature: 25° C.) along with a first direction and hot stretched (stretch ratio: 150%, stretch temperature: 128° C.) along with the first direction. Finally, The PP/PE/PP substrate was relaxed to 30% to obtain a porous separator having a heat-resistant layer formed thereon.

Figure 2:
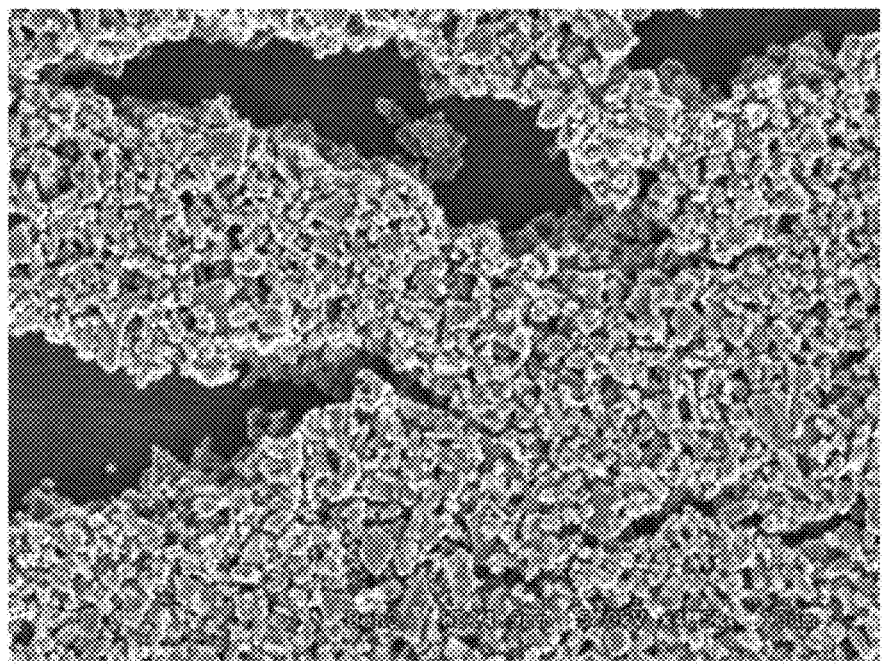
FIG. 2 shows a scanning electron microscopic (SEM) image (magnification of 4,500 times) of a surface of the separator of Example 1 according to the present invention.

The surface of the separator was observed under a scanning electron microscopic. The scanning electron microscopic (SEM) image of the surface with a magnification of 200 times was showed in FIG. 1, the scanning electron microscopic (SEM) image of the surface with a magnification of 4500 times was showed in FIG. 2.

Example 2

A porous separator having a heat-resistant layer was prepared by the procedures same as Example 1, except the stretch ratio of the cold stretch was changed to 30%, the stretch ratio of the hot stretch was changed to 140%, and the relax ratio after the hot stretch was changed to 15%.

Figure 3:
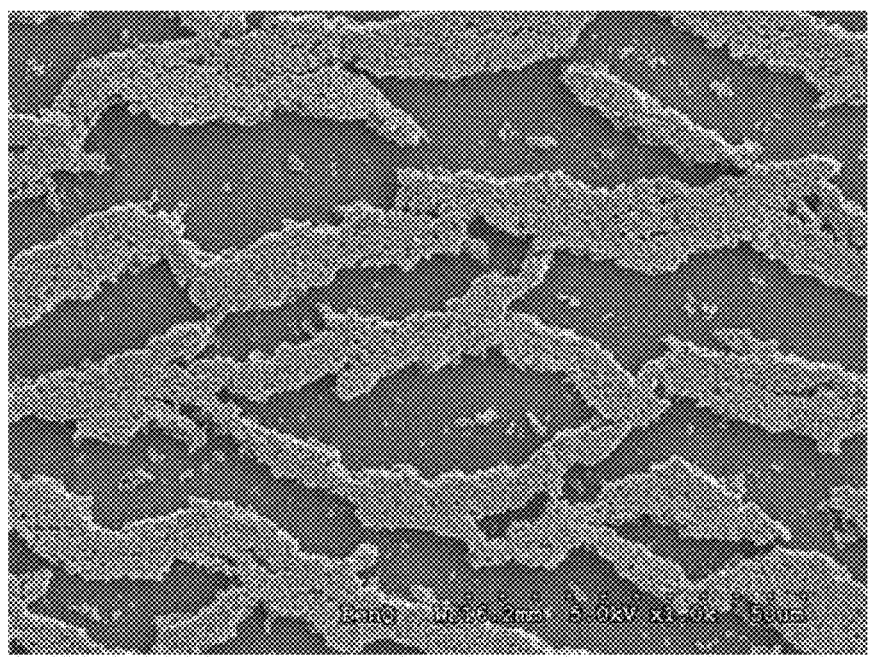
FIG. 3 shows a scanning electron microscopic (SEM) image (magnification of 1,000 times) of a surface of the separator of Example 2 according to the present invention.
Figure 4:
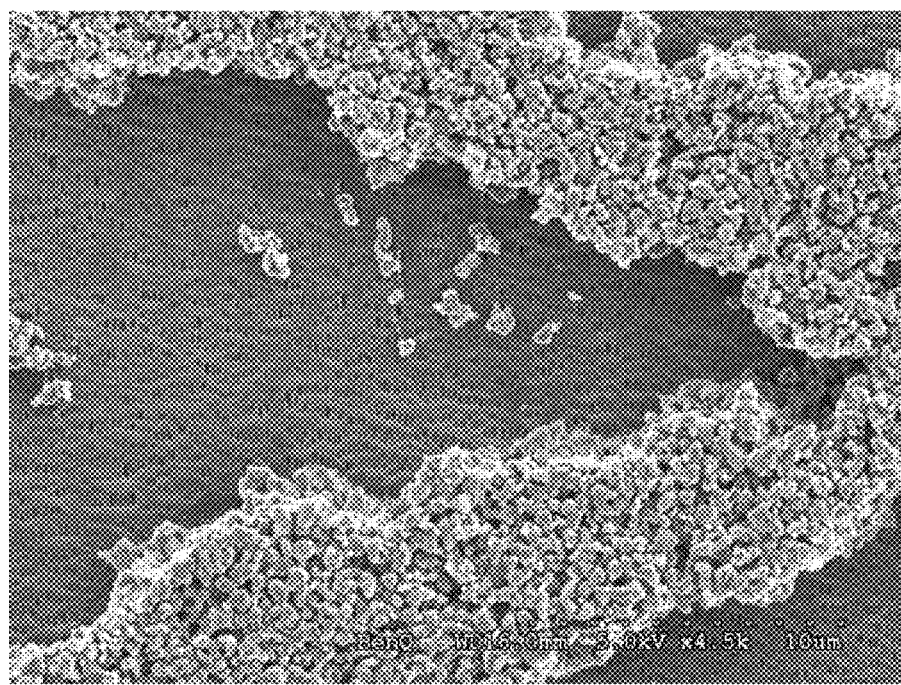
FIG. 4 shows a scanning electron microscopic (SEM) image (magnification of 4,500 times) of a surface of the separator of Example 2 according to the present invention.
Figure 5:
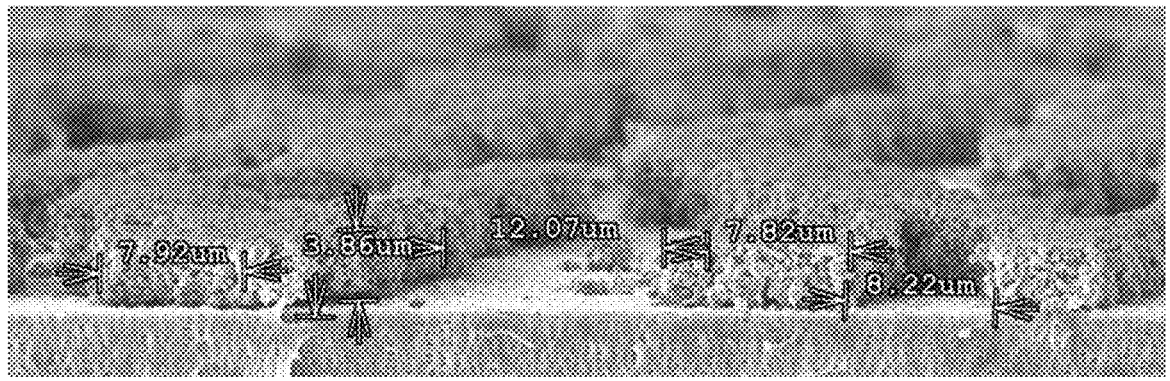
FIG. 5 shows a scanning electron microscopic (SEM) image (magnification of 2,000 times) of a cross-section view of the separator of Example 2 according to the present invention.

The surface and the cross-section of the separator were observed under a scanning electron microscopic. The scanning electron microscopic (SEM) image of the surface with a magnification of 200 times was showed in FIG. 3, the scanning electron microscopic (SEM) image of the surface with a magnification of 4500 times was showed in FIG. 4, the scanning electron microscopic (SEM) image of the cross-section with a magnification of 2000 times was showed in FIG. 5.

Example 3

A porous separator having a heat-resistant layer was prepared by the procedures same as Example 1, except the stretch ratio of the cold stretch was changed to 30% and the relax ratio after the hot stretch was changed to 11%.

Figure 6:
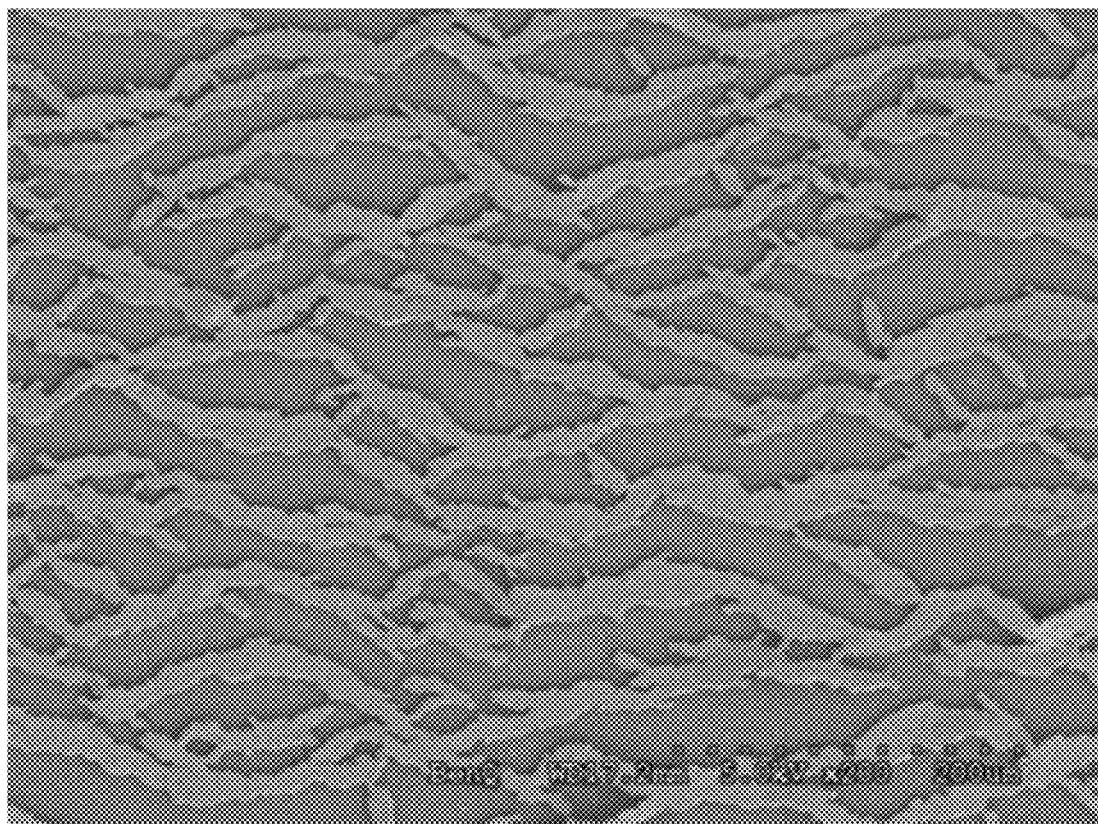
FIG. 6 shows a scanning electron microscopic (SEM) image (magnification of 200 times) of a surface of the separator of Example 3 according to the present invention.
Figure 7:
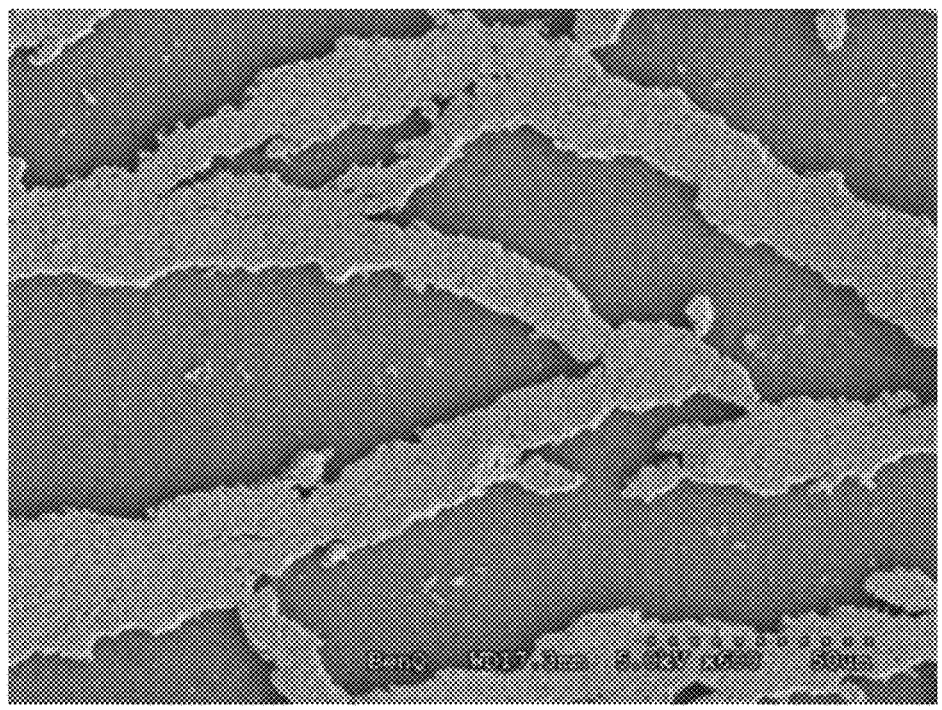
FIG. 7 shows a scanning electron microscopic (SEM) image (magnification of 600 times) of a surface of the separator of Example 3 according to the present invention.

The surface the separator was observed under a scanning electron microscopic. The scanning electron microscopic (SEM) image of the surface with a magnification of 200 times was showed in FIG. 6, the scanning electron microscopic (SEM) image of the surface with a magnification of 600 times was showed in FIG. 7.

Example 4

A porous separator having a heat-resistant layer was prepared by the procedures same as Example 1, except the stretch ratio of the cold stretch was changed to 30%, the stretch ratio of the hot stretch was changed to 170%, and the relax ratio after the hot stretch was changed to 10%.

Figure 8:
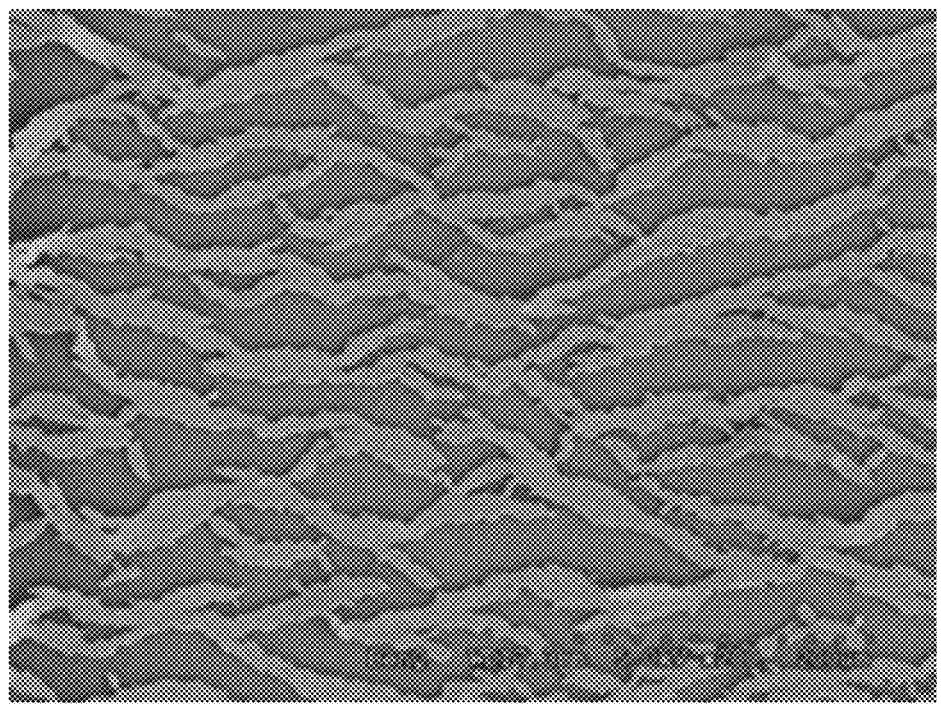
FIG. 8 shows a scanning electron microscopic (SEM) image (magnification of 200 times) of a surface of the separator of Example 4 according to the present invention.
Figure 9:
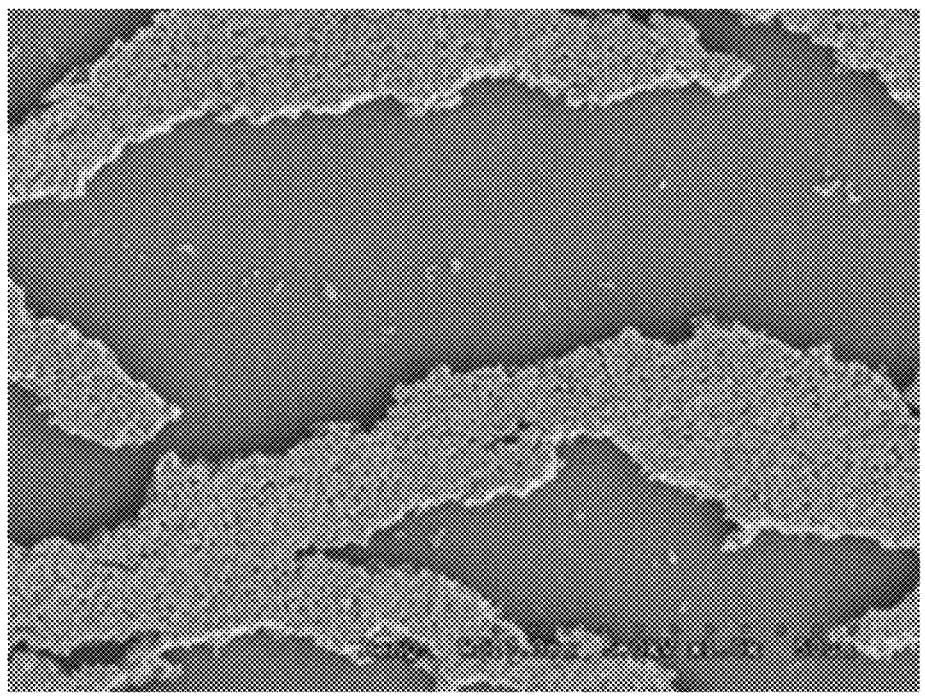
FIG. 9 shows a scanning electron microscopic (SEM) image (magnification of 1,000 times) of a surface of the separator of Example 4 according to the present invention.

The surface of the separator was observed under a scanning electron microscopic. The scanning electron microscopic (SEM) image of the surface with a magnification of 200 times was showed in FIG. 8, the scanning electron microscopic (SEM) image of the surface with a magnification of 1000 times was showed in FIG. 9.

Example 5

The heat-resistant slurry prepared as Example 1 was coated on a PP/PE/PP nonporous precursor substrate with a thickness of 21 μm. The PP/PE/PP nonporous precursor substrate with the heat-resistant coating layer was cold stretched (stretch ratio: 30%, stretch temperature: 25° C.) along with a first direction and hot stretched (stretch ratio: 130%, stretch temperature: 125° C.) along with the first direction. And then, the PP/PE/PP substrate was relaxed to 10%. Finally, the PP/PE/PP substrate was hot stretched (stretch ratio: 50%, stretch temperature: 130° C.) along with a second direction perpendicular to the first direction and simultaneous relaxed along with the first direction of 30% to obtain a porous separator having a heat-resistant layer formed thereon.

Figure 10:
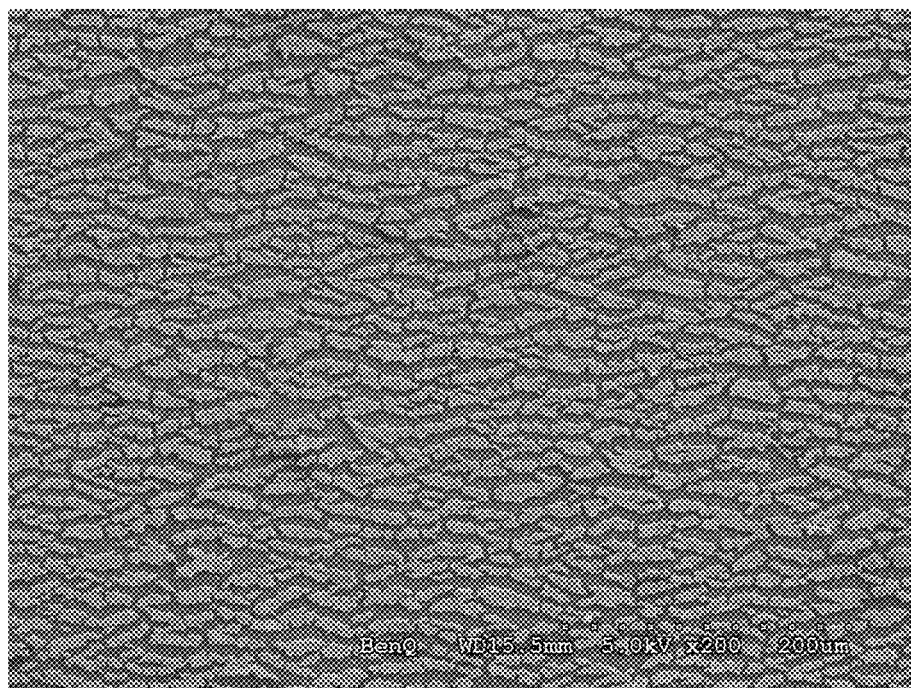
FIG. 10 shows a scanning electron microscopic (SEM) image (magnification of 200 times) of a surface of the separator of Example 5 according to the present invention.
Figure 11:
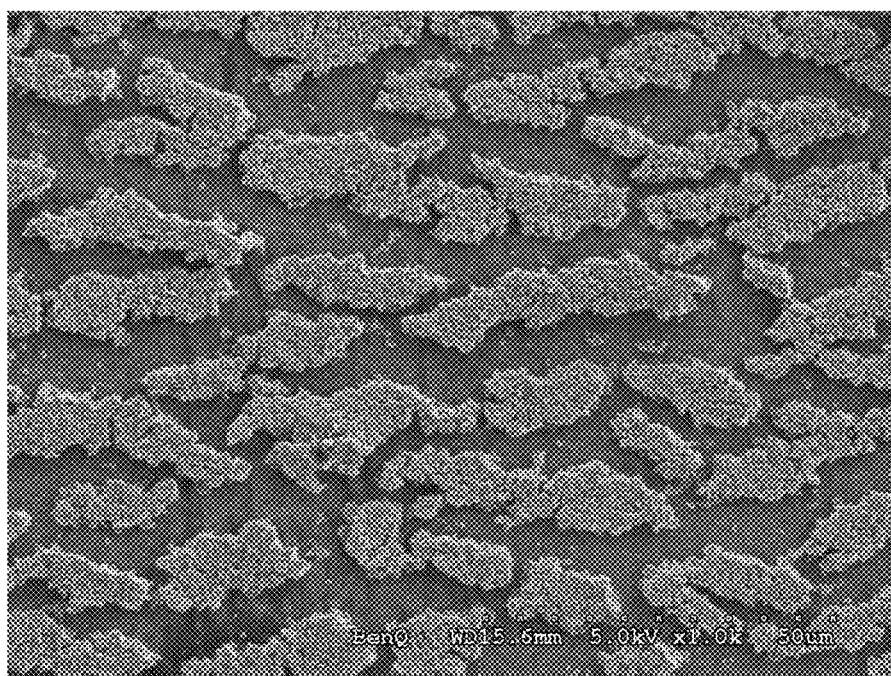
FIG. 11 shows a scanning electron microscopic (SEM) image (magnification of 1,000 times) of a surface of the separator of Example 5 according to the present invention.

The surface of the separator was observed under a scanning electron microscopic. The scanning electron microscopic (SEM) image of the surface with a magnification of 200 times was showed in FIG. 10, the scanning electron microscopic (SEM) image of the surface with a magnification of 1500 times was showed in FIG. 11.

Example 6

A porous separator having a heat-resistant layer was prepared by the procedures same as Example 5, except the stretch ratio of the hot stretch along with the second direction was changed to 20% and simultaneous relaxed along with the first direction of 10%.

Figure 12:
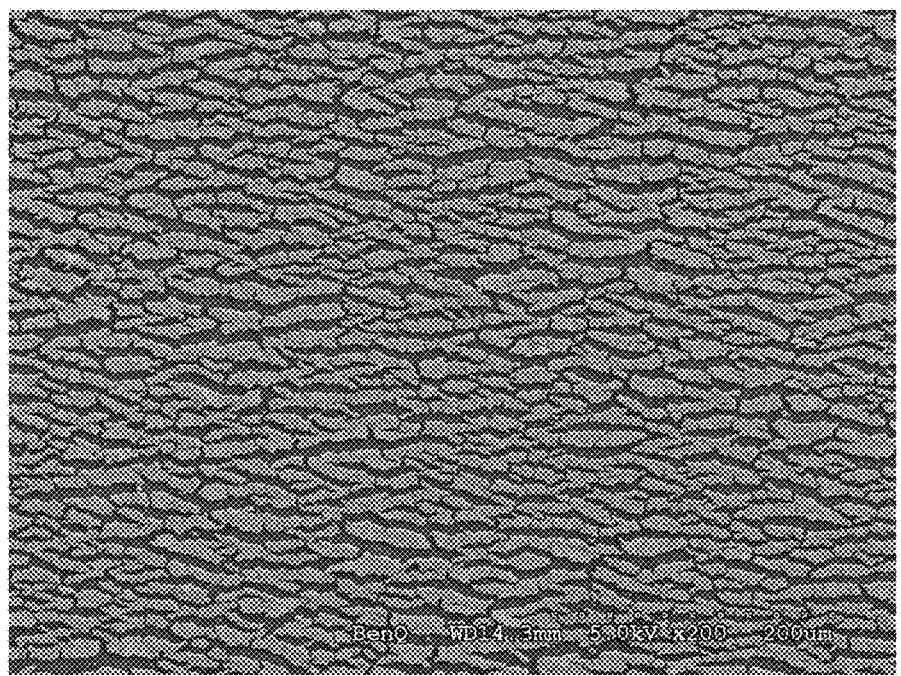
FIG. 12 shows a scanning electron microscopic (SEM) image (magnification of 200 times) of a surface of the separator of Example 6 according to the present invention.
Figure 13:
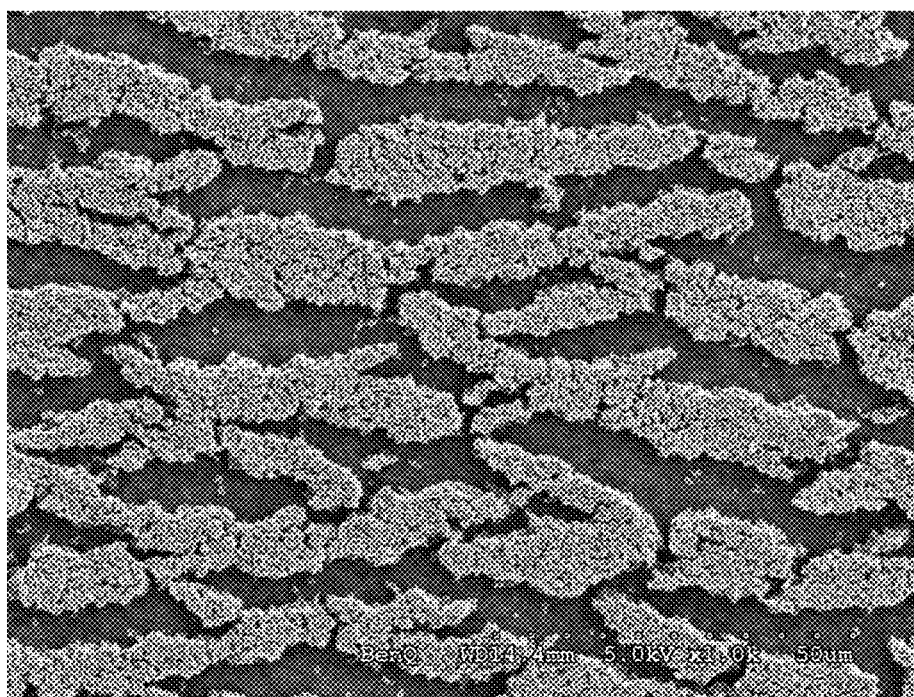
FIG. 13 shows a scanning electron microscopic (SEM) image (magnification of 1,000 times) of a surface of the separator of Example 6 according to the present invention.

The surface of the separator was observed under a scanning electron microscopic. The scanning electron microscopic (SEM) image of the surface with a magnification of 200 times was showed in FIG. 12, the scanning electron microscopic (SEM) image of the surface with a magnification of 1000 times was showed in FIG. 13.

Comparative Example 1

A porous separator was prepared by the procedures same as Example 1, except that there was no heat-resistant slurry coated on the PP/PE/PP nonporous precursor substrate.

Comparative Example 2

A PP/PE/PP nonporous precursor substrate with a thickness of 21 μm was cold stretched (stretch ratio: 30%, stretch temperature: 25° C.) along with a first direction and hot stretched (stretch ratio: 130%, stretch temperature: 125° C.) along with the first direction thereafter. And then, the PP/PE/PP substrate was relaxed to 10% to obtain a PP/PE/PP porous substrate with a thickness of 18 μm. Next, a heat-resistant slurry prepared as Example 1 was coated on the PP/PE/PP porous substrate to form a heat-resistant coating layer thereon. Finally, the PP/PE/PP substrate with a heat-resistant coating layer formed thereon was dried in oven at 85° C. for 2 minutes to obtain a porous separator comprising a heat-resistant layer completely covered thereon.

Figure 14:
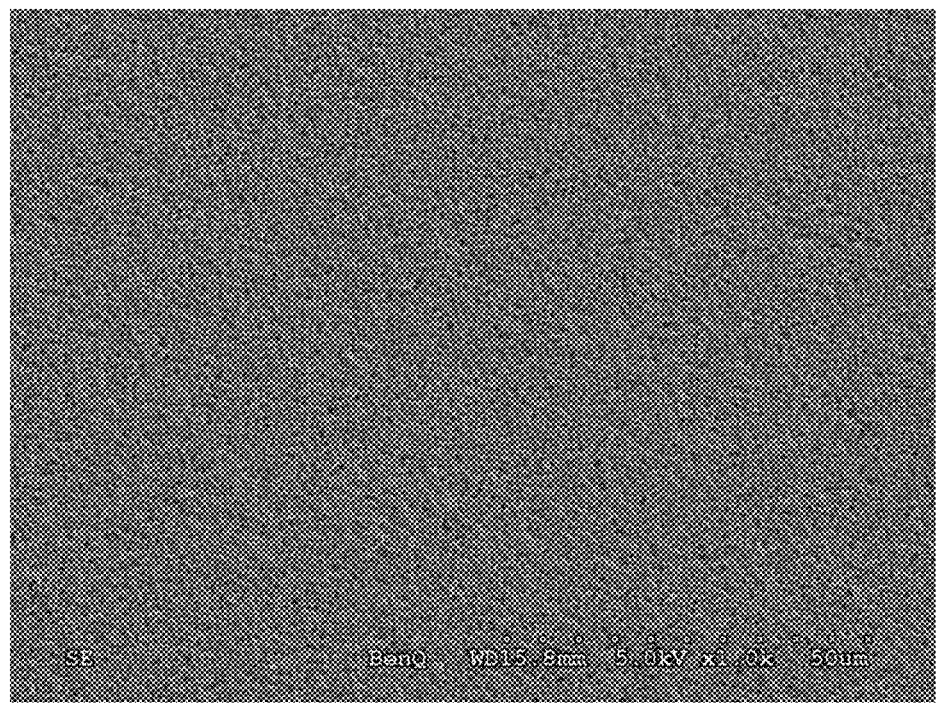
FIG. 14 shows a scanning electron microscopic (SEM) image (magnification of 1,000 times) of a surface of the separator of Comparative Example 2 according to the present invention.

The surface of the separator was observed under a scanning electron microscopic. The scanning electron microscopic (SEM) image of the surface with a magnification of 1000 times was showed in FIG. 14.

The physical properties of the separator of Examples 1-6 and Comparative Examples 1-2 were measured by the following methods.

Heat-Resistant Layer Covering Rate

An electron microscope (Hitachi S-4300) was used to photograph the surface of the separators, and then the photographs obtained were analyzed by an image analysis software to calculator the heat-resistant layer covering rate thereof.

Thickness of Separators

The thickness was measured according to GB/T6672-2001. Thickness Analyzer (VL-50-B, available from Mitutoyo, Japan) was used to measure the thickness of the separators. The measurement was conducted by a probe with diameter of 3 mm with a measuring force of 0.01 N.

Measurement of Gurley Number

The Gurley number was measured by the Oken type air permeability tester (EG01-55, available from Asahi Seiko, Japan) according to JIS P 8117-2009. The Gurley number was obtained by the pressure difference between the constant pressure room and the pressure measuring room.

AC Impedance

The separators of Examples 1-6 and Comparative Examples 1-2 were cut into round shapes with a diameter of 24 mm, and then immersed into a standard electrolyte ($LiPF_6$ solution with concentration of 1 M, the weight ratio of the solvents: EC/DMC/EMC=1/1/1) for 12 hours to make the electrolyte completely penetrate the separators. After that, the separators were put between two electrodes and measured the AC impedance with a frequency in the range of 1000 to 200000.

Puncture Strength

The puncture strength was measured by tensile tester (MSG-5, available from Kato Tech, Japan). The separators were punctured by a round head stainless steel needle with a diameter of 1 mm and a corner radius of 0.5 with at a speed of 100±10 mm/min. The puncture strength was determined by the maximum force for piercing the separators.

Water Content (Moisture)

The water content was measured according to JIS K0068-2001. The separators were put into Karl Fischer at 150° C. for 300 seconds, then the water content of the separators were measured.

Heat Resistance (Shrinkage)

Each of the separators was cut into a size of 10 cm×10 cm and marked the initial length of machine direction M0 of the center respectively. After marked, the separators were sandwiched between two A4 papers and put in to oven at 130° C. for 1 hour. After heating, the separators were put in the environment condition as the measuring instrument for 30 minutes, and then the length of machine direction M0 of the center was measured. The machine direction shrinkage (MDS) was calculated by the following formula:

$$SMD=(M0-M1)/M0\times 100\%.$$

The above mentioned physical properties were shown as the following Table 1 and Table 2.

As shown in Table 1, the porous separators comprising a heat-resistant layer of Example 1 to Example 4 have better heat resistance and puncture strength and can still maintain similar Gurley number and AC impedance compare to the separator without heat-resistant layer of Comparative Example 1. The porous separators having a heat-resistant layer of Example 1 to Example 4 have lower water content, better Gurley number and AC impedance compare to the separator having heat-resistant layer completely covering the substrate of Comparative Example 2.

TABLE 2

| Physical properties of Example 5-6 | | |
|---|---|---|
| | Example 5 | Example 6 |
| Heat-resistant layer covering rate (%) | 60 | 70 |
| Total thickness (μm) | 19.4 | 20.1 |
| Heat-resistant layer thickness (μm) | 4 | 4 |
| Gurley number (sec.) | 103 | 115 |
| AC impedance (ohm · cm$^2$) | 0.68 | 0.77 |
| Puncture strength (gf) | 286 | 302 |
| Moisture (ppm) | 213 | 229 |
| MD Shrinkare (%) | 17 | 30 |

As shown in Table 2, the separators having a heat-resistant layer obtained by biaxially stretching process of Example 5 and Example 6 have better Gurley number and AC impedance. Compare to the separator without a heat-resistant layer of Comparative Example 1, the separators of Example 5 and Example 6 have better heat resistance and can still maintain the suitable properties to be a battery separator such as water content and puncture strength.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A separator, comprising:
   a porous substrate; and
   a heat-resistant layer comprising a binder and a plurality of inorganic particles;
   wherein the heat-resistant layer is disposed on a surface of the porous substrate in the range of 30% to 80% of the total surface area of the porous substrate;

TABLE 1

| Physical properties of Example 1-4 and Comparative Example 1-2 | | | | | | |
|---|---|---|---|---|---|---|
| | Example 1 | Example 2 | Example 3 | Example 4 | Comparative Example1 | Comparative Example2 |
| Heat-resistant layer covering rate (%) | 80 | 45 | 35 | 30 | 0 | 100 |
| Total thickness (μm) | 21.3 | 21.9 | 21.6 | 21.8 | 18 | 21.6 |
| Heat-resistant layer thickness (μm) | 4.1 | 4 | 4.1 | 4 | 0 | 4 |
| Gurley number (sec.) | 220 | 202 | 198 | 196 | 200 | 230 |
| AC impedance (ohm · cm$^2$) | 1.52 | 1.35 | 1.31 | 1.29 | 1.3 | 1.6 |
| Puncture strength (gf) | 329 | 340 | 332 | 330 | 330 | 335 |
| Moisture (ppm) | 550 | 238 | 190 | 169 | 86 | 575 |
| MD Shrinkage (%) | 15 | 23 | 28 | 30 | >50 | 10 | wherein a Gurley number of the separator is less than or equal to 220 sec.

2. The separator according to claim 1, wherein the heat-resistant layer is a continuous network structure or an island structure on the surface of the porous substrate.

3. The separator according to claim 1, wherein the thickness of the heat-resistant layer is in the range of 0.01 μm to 20 μm.

4. The separator according to claim 1, wherein the heat-resistant layer comprises 1 to 20 parts by weight of the binder and 80 to 99 parts by weight of the inorganic particles.

5. The separator according to claim 1, wherein the median diameter (D50) of the inorganic particles is in the range of 0.01 μm to 10 μm.

6. The separator according to claim 1, wherein the heat-resistant layer is formed on the surface of the porous substrate by coating a heat-resistant slurry on a nonporous precursor substrate to form a coated nonporous precursor substrate, and stretching the coated nonporous precursor substrate to form a separator comprising the porous substrate and the heat-resistant layer.

7. The separator according to claim 1, wherein the binder is selected from at least one of the group consisting of polyvinyl chloride (PVC), polyvinyl fluoride (PVF), polytetrafluoroethylene (PTFE), polyvinylidene fluoride (PVDF), polyvinylidene fluoride-tetrafluoroethylene (PVDF-TFE), polyvinylidene fluoride-hexafluoropropylene (PVDF-HFP), polyvinylidene fluoride-trichloroethylene copolymer, polyvinylidene fluoride-tetrafluoroethylene chloride (PVDF-CTFE), poly(methyl)(meth)acrylate (P(M)(M)A), polyacrylonitrile (PAN), polyvinylacetate (PVA), polyethylene-vinyl acetate copolymer, polyimide (PI), styrene butadiene rubber (SBR), polyethylene oxide (PEO), propylene oxide (PPO), poly(N-vinylacetamide) (PNVA) and poly(N-vinylformamide) (PNVF), or combinations thereof.

8. The separator according to claim 1, wherein the inorganic particles are selected from at least one the group consisting of $BaTiO_3$, $Pb(Zr,Ti)O_3$ (PZT), $Pb_{1-x}La_xZr_{1-y}Zr,Ti_yO_3$ (PLZT, wherein $0<x<1$ and $0<y<1$), $Pb(Mg_{1/3}Nb_{2/3})O_3-PbTiO_3$ (PMN-PT), $HfO_2$, $SrTiO_2$, $SnO_2$, $CeO_2$, $MgO$, $Mg(OH)_2$, $NiO$, $CaO$, $ZnO$, $ZrO_2$, $SiO_2$, $Y_2O_3$, $Al_2O_3$, Boehmite (AlOOH), SiC and $TiO_2$, or combinations thereof.

* * * * *